(12) United States Patent
Yamashita et al.

(10) Patent No.: US 8,361,575 B2
(45) Date of Patent: Jan. 29, 2013

(54) POLYPHENYLENE SULFIDE-BASED HEAT-SHRINKABLE TUBE AND COMPONENT COVERED WITH THE TUBE

(75) Inventors: Motoi Yamashita, Shiga (JP); Hidetaka Arai, Shiga (JP); Kouichirou Taniguchi, Shiga (JP); Asami Kitajima, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 152 days.

(21) Appl. No.: 13/062,342

(22) PCT Filed: Sep. 8, 2009

(86) PCT No.: PCT/JP2009/065669
§ 371 (c)(1),
(2), (4) Date: Mar. 4, 2011

(87) PCT Pub. No.: WO2010/027084
PCT Pub. Date: Mar. 11, 2010

(65) Prior Publication Data
US 2011/0171409 A1   Jul. 14, 2011

(30) Foreign Application Priority Data

Sep. 8, 2008   (JP) ................. 2008-230090
Sep. 10, 2008  (JP) ................. 2008-232747

(51) Int. Cl.
*B65B 53/00* (2006.01)
*F16B 4/00* (2006.01)
(52) U.S. Cl. .............. 428/35.1; 428/34.4; 428/35.5; 428/36.9; 428/332; 428/910; 428/220
(58) Field of Classification Search ........... 428/34.4, 428/35.5, 36.9, 332, 910, 220, 35.1
See application file for complete search history.

(56) References Cited

U.S. PATENT DOCUMENTS

| | | | |
|---|---|---|---|
| 5,625,002 A | 4/1997 | Kadoi et al. | |
| 5,654,358 A | 8/1997 | Kadoi et al. | |
| 5,718,953 A * | 2/1998 | Shikama et al. | 428/34.4 |
| 2010/0104783 A1 | 4/2010 | Kitajima et al. | |

FOREIGN PATENT DOCUMENTS

| | | |
|---|---|---|
| JP | 61 207462 | 9/1986 |
| JP | 1 306467 | 12/1989 |
| JP | 2 215861 | 8/1990 |
| JP | 8 165431 | 6/1996 |
| JP | 9 157402 | 6/1997 |
| JP | 2000 309706 | 11/2000 |
| JP | 2001 15874 | 1/2001 |
| JP | 2006 219665 | 8/2006 |

OTHER PUBLICATIONS

International Search Report issued Dec. 15, 2009 in PCT/JP09/065669 filed Sep. 8, 2009.

* cited by examiner

*Primary Examiner* — Michael C Miggins
(74) *Attorney, Agent, or Firm* — Oblon, Spivak, McClelland, Maier & Neustadt, L.L.P.

(57) ABSTRACT

The present invention provides a heat-shrinkable polyphenylene sulfide-based tube containing a resin composition (A) including a thermoplastic polyphenylene sulfide-based resin (a) as a main constituent, having a difference of 35° C. or more between the cold crystallization temperature Tc as measured by a differential scanning calorimetry in accordance with JIS-K7121 and the glass transition temperature Tg measured in the same manner, and having the glass transition temperature Tg between 65° C. and 85° C.; and the invention provides a component covered with the tube. The heat-shrinkable polyphenylene sulfide-based tube fulfills the characteristics required for a heat-shrinkable tube, such as heat resistance, low-temperature shrinkage characteristics, electrical characteristics, chemical resistance, and electrolytic solution resistance.

20 Claims, No Drawings

POLYPHENYLENE SULFIDE-BASED HEAT-SHRINKABLE TUBE AND COMPONENT COVERED WITH THE TUBE

TECHNICAL FIELD

The present invention relates to a polyphenylene sulfide-based heat-shrinkable tube and a component covered with the tube; more particularly, it relates to a heat-shrinkable tube which is excellent in heat resistance and low-temperature shrinkage characteristics and preferable as for covering electronic components, in particular, capacitors such as aluminum electrolysis capacitors, and a component covered with the tube.

BACKGROUND ART

Conventionally, heat-shrinkable tubes composed of mainly polyvinyl chloride have been used widely as electrical insulation materials for use in applications such as covering capacitors. In recent years, for making lighter, thinner, shorter, and smaller products, electronic components such as capacitors have been densely assembled, and fields such as electric components for automobiles whose operating temperature is high have been expanding rapidly. For these reasons, heat-shrinkable tubes have been required to have favorable heat resistance. The heat-shrinkable tubes made of polyvinyl chloride have problems such as insufficient heat resistance, and generation of hydrogen chloride gas during combustion, which is likely to damage an incinerator in the case of disposal such as incineration. For this reason, as alternatives to the heat-shrinkable tubes composed of polyvinyl chloride, heat-shrinkable tubes composed of crystalline resins such as polyester-based resins or polyphenylene sulfide-based resins have come to be used.

Above all, polyphenylene sulfide-based resins are excellent in not only heat resistance, but also flame retardancy, chemical resistance, electrolytic solution resistance and the like, and thus preferable for electric components of automobiles and electronic component applications. Attention has been focused on the characteristics to consider heat-shrinkable tubes using polyphenylene sulfide-based resins (Patent Document 1). However, the tube obtained in accordance with the method described in Patent Document 1 has a problem that the high glass transition temperature Tg of the resin fails to achieve shrinkage for a short period of time. The rate of step of covering a capacitor or the like with the tube is increased under recent production conditions, in other words, for the purpose of improvement in productivity, thereby resulting in a failure to apply the tube under production conditions of which covering conditions are at a higher temperature and a shorter period of time.

In order to solve the problems described above, the inventors have proposed a tube which is composed mainly of a polyphenylene sulfide-based resin and excellent in low-temperature shrinkage characteristics. However, when the tube is exposed to high temperatures insteps such as assembling a capacitor, problems, for example, relaxation of the tube once closely attached to a component such as a capacitor due to crystal growth (heat-resistant swelling) are pointed out. Thus, further improvements to the heat-resistant swelling have been required in applications such as covering capacitors. Patent Document 1: Japanese Patent Application Laid-Open No. 9-157402

DISCLOSURE OF THE INVENTION

Problem to be Solved by the Invention

The present invention has been made to solve the problems described above, and an object of the present invention is to provide a polyphenylene sulfide-based heat-shrinkable tube which has excellent heat resistance and fulfills the characteristics required for a heat-shrinkable tube, such as low-temperature shrinkage characteristics, electrical characteristics, chemical resistance, and electrolytic solution resistance, and a component covered with the tube.

Means for Solving the Problem

As a result of intensive studies on polyphenylene sulfide-based resins by the inventors, they found, in order to solve the problems described above, a heat-shrinkable polyphenylene sulfide-based tube which fulfills the characteristics required for a heat-shrinkable tube, such as low-temperature shrinkage characteristics, and is excellent in heat resistance; and they completed the present invention below.

The first aspect of the invention is a polyphenylene sulfide-based heat-shrinkable tube (hereinafter, referred to as a "tube according to the present invention") including a resin composition (A) containing a thermoplastic polyphenylene sulfide-based resin (a) as a main constituent, having a difference of 35° C. or more between a cold crystallization temperature Tc and a glass transition temperature Tg measured by a differential scanning calorimetry in accordance with JIS-K7121, and having the glass transition temperature Tg in the range of 65° C. or more and 85° C. or less.

According to the first aspect of the invention, the resin composition (A) preferably contains a thermoplastic elastomer (b).

According to the first aspect of the invention, the resin composition (A) preferably contains a plasticizer (c). Furthermore, the plasticizer (c) is preferably a phosphorus-based plasticizer.

According to the first aspect of the invention, the tube preferably exhibits flame retardancy VW-1 in accordance with evaluation by UL224 Optional VW-1 Flame Test and fracture energy of 0.2 J or more by a puncture impact test at 23° C.

According to the first aspect of the invention, the content rate of the thermoplastic elastomer (b) is preferably 0.5 mass % or more and 13 mass % or less with respect to 100 mass % of the resin composition (A) containing the thermoplastic elastomer (b).

According to the first aspect of the invention, the content rate of the plasticizer (c) is preferably 0.5 mass % or more and 15 mass % or less with respect to 100 mass % of the resin composition (A) containing the plasticizer (c).

According to the first aspect of the invention, the tube preferably includes a resin composition containing: 80-95 mass % of the thermoplastic polyphenylene sulfide-based resin (a); 3-13 mass % of the thermoplastic elastomer (b); and 0.5-15 mass % of the phosphorus-based plasticizer (c), with respect to the total 100 mass % of the thermoplastic polyphenylene sulfide-based resin (a), the thermoplastic elastomer (b), and the phosphorus-based plasticizer (c).

According to the first aspect of the invention, the resin composition (A) preferably contains other thermoplastic resin(s) (d) than the thermoplastic polyphenylene sulfide-based resin (a).

According to the first aspect of the invention, the content rate of the thermoplastic resin(s) (d) is preferably 0.5 mass % or more and 25 mass % or less with respect to 100 mass % of the resin composition (A) containing the thermoplastic resin (s) (d).

According to the first aspect of the invention, the heat shrinkage ratio in the case of immersion in warm water at 100° C. for 5 seconds is preferably 30% or more and 70% or less in a radial direction, and 30% or less in a length direction.

According to the first aspect of the invention, the heat shrinkage ratio in the case of immersion in warm water at 90° C. for 5 seconds is preferably 20% or more and 60% or less in a radial direction, and 25% or less in a length direction.

A second aspect of the invention is a component covered with the polyphenylene sulfide-based heat-shrinkable tube according to the first aspect of the invention. The component is preferably used in an application of an electronic device or an electric device.

Effect of the Invention

According to the present invention, it is possible to provide polyphenylene sulfide-based heat-shrinkable tubes which are excellent in heat resistance, and further fulfill the characteristics required for a heat-shrinkable tube, such as low-temperature shrinkage characteristics, electrical characteristics, chemical resistance, and electrolytic solution resistance. Therefore, the present invention is useful as a covering material for electronic components such as capacitors, primary batteries, and secondary batteries, as an alternative to conventional vinyl chloride-based heat-shrinkable tubes or polyester-based heat-shrinkable tubes.

BEST MODE FOR CARRYING OUT THE INVENTION

A tube and a component covered with the tube according to the present invention will be described below in detail.

It is to be noted that the term "containing as a main constituent" in this specification allows other constituents to be contained within a range that does not interfere with the functions and effects of a resin and plasticizer constituting a resin composition (A). Furthermore, this term is not considered to limit any specific content rates; the content rate of the main constituent may be a range of 50 mass % or more, preferably 60 mass % or more, further preferably 70 mass % or more and 100 mass % or less of the entire constituent of the resin composition (A).

[Heat-Shrinkable Tube]

The tube according to the present invention is characterized by including the resin composition (A) containing, as its main constituent, a thermoplastic polyphenylene sulfide-based (hereinafter, referred to as a "PPS") resin (a), having a difference (Tc–Tg) of 35° C. or more between the cold crystallization temperature Tc and the glass transition temperature Tg measured by differential scanning calorimetry (DSC) in accordance with JIS-K7121, and having the glass transition temperature Tg in the range of 65° C. or more and 85° C. or less.

<Cold Crystallization Temperature Tc and Glass Transition Temperature Tg>

The tube according to the present invention has the difference Tc–Tg of 35° C. or more. The difference Tc–Tg of 35° C. or more can provide the heat-shrinkable film with excellent heat resistance, and the film according to the present invention can be thereby preferably used as a covering material for capacitors and batteries. If the difference Tc–Tg is less than 35° C., problems will be likely to be caused, such as relaxation of the tube once closely attached to a covered body such as a capacitor due to crystal growth, in the case of exposure to high temperatures in steps of, for example, assembling capacitors. In addition, while the difference Tc–Tg has no particular upper limit, the difference Tc–Tg preferably has an upper limit on the order of 60° C., because an excessive increase in difference Tc–Tg damages the heat resistance as a feature of the PPS resin (a).

In order to adjust the difference Tc–Tg within the temperature range, it is possible to appropriately adjust the combination of resins to be used, the additive amounts of a thermoplastic elastomer (b) and plasticizer (c) and the like. For example, when a reduction in the value of the difference Tc–Tg is required, the adjustment can be achieved by reducing the amount of the thermoplastic elastomer (b), increasing the additive amount of the plasticizer (c), or adding a resin which has a high crystallization rate, such as a polybutylene terephthalate. On the other hand, when an increase in the value of the difference Tc–Tg is required, the adjustment can be achieved by increasing the amount of the thermoplastic elastomer (b), reducing the additive amount of the plasticizer (c), or adding an amorphous resin such as a polycarbonate.

In addition, the tube according to the present invention is supposed to have a glass transition temperature Tg of 65° C. or more and 85° C. or less, from the standpoint that the tube with a specific glass transition temperature Tg is particularly excellent in performance as a covering material for capacitors and batteries. The glass transition temperature Tg less than 65° C. is likely to cause problems such as deterioration of thickness accuracy when stretching, whereas the glass transition temperature Tg greater than 85° C. is likely to cause problems such as a failure to achieve favorable finish of covering in a step of covering a capacitor and the like.

Adjusting the glass transition temperature Tg within the temperature range mentioned above can be carried out by appropriately adjusting the combination of resins to be used, the additive amounts of the thermoplastic elastomer (b) and plasticizer (c) and the like. For example, in the case of requiring a depression of the glass transition temperature Tg to the lower temperature side (65° C. side), the adjustment can be achieved by increasing the amount of the thermoplastic elastomer (b), increasing the additive amount of the plasticizer (c), or adding a resin which has a lower glass transition temperature Tg than the PPS resin (a), such as a polystyrene; on the other hand, in the case of requiring an elevation of the glass transition temperature Tg to the higher temperature side (85° C. side), the adjustment can be achieved by reducing the amount of the thermoplastic elastomer (b), reducing the additive amount of the plasticizer (c), or adding a resin which has a higher glass transition temperature Tg than the PPS resin (a), such as a polycarbonate.

The cold crystallization temperature Tc mentioned above can be obtained from a thermogram in the case of increasing the temperature of a sample of 10 mg cut out from a tube from –50° C. to 340° C. at a heating rate of 10° C./min in accordance with JIS-K7121 with the use of DSC-7 manufactured by PerkinElmer, Inc. In addition, the glass transition temperature Tg can be obtained likewise from a thermogram in the case of increasing the temperature of a sample of 10 mg cut out from a tube from –50° C. to 340° C. at a heating rate of 10° C./min, keeping the sample at 340° C. for 1 minute, then decreasing the temperature to –50° C. at a cooling rate of 10° C./min, keeping the sample at –50° C. for 1 minute, and then increasing the temperature again at a heating rate of 10° C./min, in accordance with JIS-K7121 with the use of DSC-7 manufactured by PerkinElmer, Inc.

Next, the thermoplastic polyphenylene sulfide-based resin (a), the thermoplastic elastomer (b), the plasticizer (c), and the other thermoplastic resins (d), which are used for the tube according to the present invention, will be described.

<Thermoplastic Polyphenylene Sulfide-based Resin (a)>

The PPS resin (a) for use in the present invention refers to a resin containing 70 mol % or more, preferably 80 mol % or more of a repeated unit of a polyphenylene sulfide represented by the following formula (1). When the following repeated unit in the PPS resin (a) accounts for 70 mol % or more, it is possible to suppress decrease in the crystallinity and thermal transition temperature of the polymer, and suppress damages to the properties such as flame retardancy, chemical resistance, and electrical properties as features of the resin composition containing the PPS resin (a) as its main constituent.

[Chemical Formula 1]

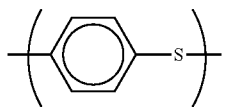

(1)

The PPS resin (a) can also contain therein other copolymerizable repeated units having a sulfide linkage as long as the content of the units is less than 30 mol %, preferably less than 20 mol %. Specific examples of the other copolymerizable repeated units include: meta-linkage units, ortho-linkage units, trifunctional units, ether units, ketone units, sulfone units, aryl units having a substitution group such as an alkyl group, biphenyl units, terphenylene units, vinylene units, and carbonate units. One of these units can be contained, or two or more thereof can be contained in combination. In this case, these constitutional units may be derived from any copolymerization method such as a random type or a block type.

While the PPS resin (a) is preferably a straight-chain/linear (linear-type) copolymer having a molecular weight of 50,000 or more, the PPS resin (a) is not to be considered limited to this type of polymer, and both polymers having a branched chain and polymers partly having a cross-linked structure can be also used.

While the PPS resin (a) may contain a low molecular weight oligomer, in that case, the content rate of the low molecular weight oligomer is preferably on the order of 1.5 mass % or less in terms of deterioration of heat resistance and of mechanical strength. The low molecular weight oligomer has a molecular weight of 100 or more and 2,000 or less, and the low molecular weight oligomer contained in the PPS resin can be removed by washing with a solvent such as diphenyl ether.

While the melt viscosity of the PPS resin (a) is not particularly limited as long as it is possible to obtain a heat-shrinkable material which fulfills certain properties, the apparent viscosity measured under the conditions of 300° C., shear velocity: 100 sec$^{-1}$, and orifice: L/D=10/1 (mm) is 100 Pa·s or more, preferably 200 Pa·s or more, and more preferably 400 Pa·s or more, and is 10,000 Pa·s or less, preferably 5,000 Pa·s or less, and more preferably 2,000 Pa·s or less. The apparent viscosity of 100 Pa·s or more allows film formation; on the other hand, the apparent viscosity of 10,000 Pa·s or less allows the suppression of a load on an extruder during extrusion.

Known production methods can be applied to the method for producing the PPS resin (a), which is not to be particularly limited. For example, a method is commonly used in which a dihalogenated aromatic compound such as a p-dichlorobenzene is reacted with a sodium salt such as a sodium sulfide in an aprotic organic solvent such as N-methyl-2-pyrrolidone (hereinafter, which may be abbreviated to as "NMP"). In order to adjust the degree of polymerization, a polymerization aid such as a caustic alkali or a carboxylic acid alkaline metal salt is preferably added to be reacted at a temperature of 230° C. or more and 280° C. or less. The pressure and polymerization time in the polymerization system may be determined appropriately depending on the desired degree of polymerization, the type and amount of the polymerization aid to be used and the like.

However, in the case of the method described above, a sodium halide is produced as a by-product and incorporated into the resin because the sodium halide is insoluble in a solvent such as NMP, and after polymerization, the sodium halide in the PPS resin cannot be removed sufficiently even if the PPS resin is washed with a large amount of water. Thus, a method can also be used in which a lithium salt is used in place of the sodium salt to carry out polymerization.

Examples of commercial products of the PPS resin (a) include: FORTRON (manufactured by Polyplastics Co., Ltd.), DIC-PPS (manufactured by DIC Corporation), and TORELINA (manufactured by TORAY INDUSTRIES, INC.).

<Thermoplastic Elastomer (b)>

While the resin composition (A) can be composed of the PPS resin (a) alone, the PPS resin (a) can be blended or alloyed with the thermoplastic elastomer (b). The blending or alloying of the PPS resin (a) with the thermoplastic elastomer (b) can improve the impact resistance of the resin composition (A).

Examples of the thermoplastic elastomer (b) which can be blended or alloyed with the PPS resin (a) include: polyester-based, polyamide-based, polyurethane-based, olefin-based copolymer, and polystyrene-based thermoplastic elastomers, nitrile-based rubbers, and acrylic-based rubbers.

Examples of the polyester-based elastomers include block copolymers which include: as a hard segment, an aromatic polyester such as polyethylene terephthalate or polybutylene terephthalate; and as a soft segment, a polyether such as polyethylene glycol or polytetramethylene glycol, or an aliphatic polyester such as polyethylene adipate, polybutylene adipate, or polycaprolactone.

In addition, examples of the polyamide-based elastomers include: block copolymers which include: as a hard segment, nylon 6, nylon 66, nylon 11, nylon 12; and as a soft segment, a polyether or an aliphatic polyester.

In addition, examples of the urethane-based elastomers include: block copolymers which include: as a hard segment, a polyurethane obtained by reacting a diisocyanate such as 4,4'-diphenylmethane diisocyanate, 4,4'-dicyclohexylmethane diisocyanate, tolylenediisocyanate, or hexamethylene diisocyanate with a glycol such as an ethylene glycol or a tetramethylene glycol; and as a soft segment, a polyether such as polyethylene glycol, polypropylene glycol, or polytetramethylene glycol, or an aliphatic polyester such as polyethylene adipate, polybutylene adipate, or polycaprolactone.

In addition, examples of the olefin-based elastomers and styrene-based elastomers include: butadiene copolymers, styrene-isoprene copolymers, butadiene-styrene copolymers (random, block, and graft copolymers), isoprene copolymers, chlorobutadiene copolymers, butadiene-acrylonitrile copolymers, isobutylene copolymers, isobutylene-butadiene copolymers, isobutylene-isoprene copolymers, ethylene-propylene copolymers, and ethylene-propylene-diene copolymers.

Furthermore, partially modified rubber constituents can also be used, which include, for example, partially hydrogenated styrene-butadiene block copolymers, acid-modified partially hydrogenated styrene-butadiene block copolymers, and partially hydrogenated styrene-isoprene block copolymers. Above all, the acid-modified partially hydrogenated styrene-butadiene block copolymers are preferable. The acid modification herein refers to modification with an organic acid such as a maleic acid, a phthalic acid, a citric acid, a malic acid, an adipic acid, or an acrylic acid; in particular, the modification with a maleic acid (for example, a maleic acid modified SEBS) is preferable.

The content rate of the thermoplastic elastomer (b) mixed with the PPS resin (a) is desirably 0.5 mass % or more, preferably 1 mass % or more, more preferably 3 mass % or more, further preferably 5 mass % or more, particularly preferably 7 mass % or more, and is 13 mass % or less, preferably 10 mass % or less, further preferably 9 mass % or less, in the case of defining the total amount of the resin composition (A) as 100 mass % which contains the thermoplastic elastomer (b). If the ratio of the thermoplastic elastomer (b) mixed with the PPS resin (a) is excessively low, the effect of adding the thermoplastic elastomer (b) is not able to be expected, whereas if the ratio is excessively high, there is a possibility that the features of PPS resin (a) such as flame retardancy may be damaged.

Examples of commercially available products of the thermoplastic elastomer (b) include: TUFTEC M (acid modified SEBS resin, manufactured by Asahi Kasei Chemicals Corporation) and KRATON G (acid modified SEBS resin, manufactured by Kraton Polymers Japan Ltd.).

<Plasticizer (c)>

The resin composition (A) may contain the plasticizer (c). The use of the plasticizer can reduce the glass transition temperature Tg of the resin composition (A) without damaging the excellent flame retardancy of the PPS resin (a), thereby resulting in the resin composition (A) provided with low temperature shrinkage characteristics.

Examples of the plasticizer (c) include a variety of known plasticizers such as phthalate ester plasticizers, tetrahydrophthalate ester plasticizers, trimellitate ester plasticizers, adipate ester plasticizers, sebacate ester plasticizers, phosphate ester plasticizers, citrate ester plasticizers, polyester plasticizers, epoxy plasticizers, lactam plasticizers, sulfonamide plasticizers, glycolate plasticizers, paraffin-based mineral oils, naphthene-based mineral oils, polyolefins, and polysiloxanes.

Above all, flame-retardant plasticizers including phosphate ester plasticizers never damage the frame retardancy as a feature of the PPS resin (a), and thus are preferable as the plasticizer (c). In addition, in view of the extrusion temperature of the PPS resin (a) of 280° C. or more and 320° C. or less, plasticizers are preferable which have a boiling point or a thermal decomposition temperature on the order of 400° C. or more. Preferable phosphate ester plasticizers include: a triphenyl phosphate, a tricresyl phosphate, a trixylenyl phosphate, and resorcinol bisdi-2,6-xylenyl phosphate.

The content rate of the plasticizer (c) contained in the resin composition (A) is 0.5 mass % or more, preferably 1 mass % or more, further preferably 3 mass % or more, and is 15 mass % or less, preferably 10 mass % or less, further preferably 9 mass % or less, most preferably 8 mass % or less, with respect to the total amount of the resin composition (A). When the content rate of the plasticizer (c) is 0.5 mass % or more, a plasticization effect is obtained, and a low-temperature shrinkage characteristics and a fold whitening suppression effect are obtained. In addition, when the content rate of the plasticizer (c) is 15 mass % or less, the melt viscosity is not excessively decreased so that the deterioration of the thickness accuracy is suppressed.

Examples of commercially available products of the plasticizer (c) include TPP (triphenyl phosphate, manufactured by DAIHACHI CHEMICAL INDUSTRY CO., LTD.), TCP (tricresyl phosphate, manufactured by DAIHACHI CHEMICAL INDUSTRY CO., LTD.), TXP (trixylenyl phosphate, manufactured by DAIHACHI CHEMICAL INDUSTRY CO., LTD.), and Px series (resorcinol bisdi-2,6-xylenyl phosphate, manufactured by DAIHACHI CHEMICAL INDUSTRY CO., LTD.).

<Thermoplastic Resins (d) Other than PPS Resin>

The resin composition (A) may be blended or alloyed with other thermoplastic resins (d) than the PPS resin (a). The PPS resin (a) blended or alloyed with other thermoplastic resins (d) than the PPS resin (a) achieves an effect of improvement in adhesion between different types of materials, which are the resin composition (A) and an ink or the like.

Examples of the thermoplastic resins (d) include: polyesters, liquid crystal polymers, polyamides, polycarbonates, polyolefins, polystyrenes, ABS resins, imide-modified ABS resins, AES resins, polyphenylene ethers, copolymers and/or mixtures of polyphenylene ethers and polystyrenes, polyimides, polyamideimides, polyarylates, polyether imides, polyetheretherketone, polyether sulfone, and polysulfones.

The content rate of the other thermoplastic resins (d) mixed with the PPS resin (a) is, desirably, preferably 0. 5 mass % or more, more preferably 1 mass % or more, further preferably 5 mass % or more, and is preferably 25 mass % or less, more preferably 20 mass % or less, further preferably 15 mass % or less, in the case of defining the total amount of the resin composition (A) as 100 mass % which contains the thermoplastic resins (d). If the ratio of the other thermoplastic resins (d) mixed with the PPS resin (a) is excessively low, the effect of adding the thermoplastic resins (d) is not able to be expected; whereas if the ratio is excessively high, there is a possibility that the features of PPS resin (a) such as flame retardancy may be damaged.

Examples of commercial products of the thermoplastic resins (d) include NOVAMID (polyamide resin, manufactured by Mitsubishi Engineering-Plastics Corporation), IUPILON (polycarbonate resin, manufactured by Mitsubishi Engineering-Plastics Corporation), HIPS (polystyrene resin, manufactured by PS-JAPAN), and NORYL (polyphenylene ether resin, manufactured by SABIC).

For the tube according to the present invention, it is possible to laminate one or more of other layers composed of a resin composition which is different from the resin composition (A), within a scope which does not damage the features of the tube. The layer(s) to be laminated may be located inside or outside the layer of the resin composition (A). In this case, while the resin composition for use in the layer to be laminated is preferably a PPS resin, the resin composition may be a resin other than the PPS resin.

<Production Method for Tube According to Present Invention>

The resin composition (A) for used in the tube according to the present invention can be produced with the use of a known production method. For example, there are a method in which the PPS resin (a), or the PPS resin (a) with the thermoplastic elastomer (b), plasticizer (c), other thermoplastic resins (d), and if necessary, other additives mixed therein, is supplied to a commonly known melt mixer such as a single-screw or twin-screw extruder, a tumbler, a V-type blender, a Banbury mixer, a kneader, or a mixing roll, and kneaded at a temperature on the order of 180° C. or more and 450° C. or less, and a method in which separately weighed constituents are supplied to each supply port of an extruder with two or more supply ports. In addition, the mixing sequence of raw materials is also not particularly limited, any method may be used: such as a method in which various types of resins, plasticizers, or additives are mixed directly with the PPS resin (a) to be used, and the mixtures is subjected to melt kneading; a method in which a master batch of the PPS resin (a) mixed with high concentrations (the typical contents is on the order of 5 to 60 mass %) of various types of resins, plasticizers, or additives is produced separately, and mixed with the PPS resin (a) to control the concentrations; a method in which some of raw materials are subjected to melt kneading in accordance with the method described above, into which the rest of the raw materials are further subjected to melt kneading; or a method in which while carrying out melt kneading of some of raw materials by a single-screw or twin-screw extruder, a side feeder is used to mix the rest of the raw materials. In addition, with regard to the small amounts of additive constituents, after kneading the other constituents in accordance with the above method or the like and forming pellet, the small amounts of additive constituents can be added to the pellet before molding.

The resin composition (A) for use in the tube according to the present invention can be combined with, if necessary, various types of aids such as organic lubricants, inorganic lubricants, inorganic fillers, stabilizers, colorants, antioxidants, ultraviolet absorbers and flame retardants, to such an extent that does not damage the properties of the resin composition (A).

Next, a method for producing the tube according to the present invention will be described. While the method for producing the tube according to the present invention is not to be considered limited, a typical method is preferably a method in which a round die is used to extrude an unstretched tube, which is then stretched to provide a seamless heat-shrinkable tube. Other methods include a method in which a T die or an I die is used to extrude and stretch a film, which is attached by fusion, welding, or bonding to provide a tubular shape, and further a method in which the tube or film is attached into a spiral shape to provide a tubular shape.

Now, the method in which a round die is used to extrude an unstretched tube, which is then stretched to provide a heat-shrinkable tube will be described in further detail. The resin composition (A) is, with the use of a melt extruder, melted by heating to a temperature of a melting point or more, extruded continuously from a round die, and then forcibly cooled to be molded into an unstretched tube. As a means for forced cooling, a method of immersion in low-temperature water, a method of using cold blast and the like can be used. Above all, the method of immersion in low-temperature water is effective because of its high cooling efficiency. This unstretched tube may be fed continuously to the subsequent stretching step, or may be rolled up once and then used as an original fabric in the subsequent stretching step. The method of feeding the unstretched tube continuously to the subsequent stretching step is preferable in terms of production efficiency and thermal efficiency.

The unstretched tube obtained in this way is pressurized for stretching by a compressed gas from the inside of the tube. While the stretching method is not to be considered particularly limited; for example, the unstretched tube is sent at a constant rate while applying a pressure generated by a compressed gas from one end of the unstretched tube to the inside of the tube, and then heated by warm water, an infrared heater, or the like, and passed through a cylindrical pipe cooled for controlling the draw ratio in a radial direction to carry out stretching at the fixed ratio. The temperature condition and the like are controlled so that the tube is stretched in an appropriate position in the cylindrical pipe. While keeping the stretching pressure with stretched tube nipped by a pair of nip rolls, the stretched tube cooled in the cylindrical pipe is taken off and rolled up as a stretched tube. While the stretching may be carried out from in any sequence from the length direction or the radial direction, it is preferable to carry out the stretching in the length direction and in the radial direction at the same time.

The draw ratio in the length direction is determined by the ratio between the feed rate of the unstretched tube and the nip roll rate after the stretching; the draw ratio in the radial direction is determined by the ratio between the unstretched outside diameter and the outside diameter of the stretched tube. As other pressurization method for stretching, a method can be also employed in which the internal pressure of a compressed gas charged is kept while both the unstretched tube sending side and the stretched tube taking side are nipped by nip rolls.

While the stretching conditions are controlled depending on the properties of the resin composition (A) to be used, such as the intended heat shrinkage ratio, the stretching temperature preferably falls within a range from +5° C. to +20° C. higher than the glass transition temperature Tg of the resin composition (A), in terms of production stability and low temperature shrinkage characteristics.

The tube according to the present invention is preferably obtained by stretching an unstretched tube in the radial direction at a ratio in the range from 1.2 times or more, preferably 1.3 times or more, more preferably 1.4 times to 3.0 times, preferably 2.5 times or less, more preferably 2.0 times or less, and in the length direction at a ratio in the range from 1.0 time or more, preferably 1.02 times to 2.0 times, preferably 1.5 times or less, more preferably 1.3 times or less. In this case, the draw ratio of 1.2 times or more in the radial direction of the tube provides a shrinkage amount enough for covering; whereas the draw ratio of 3.0 times or less can suppress a tendency to increase variations in thickness and suppress a decrease in shrinkage ratio due to oriented crystallization. On the other hand, the draw ratio of 2.0 times or less in the length direction of the tube can suppress an excessively increased shrinkage amount in the length direction, which causes a phenomenon of misalignment in covering position when a covering process is applied to an electronic component or the like, and suppress an increase in cost because it is even not necessary to increase the cut length.

<Properties of Tube According to Present Invention>

The tube according to the present invention is composed of the resin composition (A) containing the PPS resin (a) as its main constituent, and when the tube provides specific heat shrinkage, is excellent in performance as a covering material, in particular, for capacitors and batteries:

(1) The tube can attain the above property by controlling the shrinkage ratio in the length direction to fall within a range of 0% or more, preferably 3% or more, more preferably 5% or more, and 30% or less, preferably 20% or less, more preferably 15% or less, and the shrinkage ratio in the radial direction to fall within a range of 30% or more, preferably 35% or more, more preferably 40% or more, and 70% or less, preferably 60% or less, more preferably 50% or less, in the case of immersion in warm water at 100° C. for 5 seconds. More preferably, the tube fulfills the following properties, as with the properties (1).

(2) The shrinkage ratio is controlled to fall within a range of 0% or more, preferably 3% or more, more preferably 5% or more, and 25% or less, preferably 20% or less, more preferably 15% or less in the length direction, and to fall within a range of 20% or more, preferably 25% or more, more preferably 30% or more, further preferably 35% or more, and 60% or less, preferably 50% or less, further preferably 45% or less in the radial direction, in the case of immersion in warm water at 90° C. for 5 seconds.

When the shrinkage ratio in the length direction is 30% or less in the case of the immersion in warm water at 100° C. for 5 seconds, the problems can be prevented, such as an excessively increased shrinkage amount in the length direction, which causes a phenomenon of misalignment in covering position when a covering process is applied to an electronic component or the like, and the requirement to increase the cut length. In addition, when the shrinkage ratio in the radial direction is 30% or more in the case of the immersion in warm water at 100° C. for 5 seconds, a shrinkage amount enough for covering can be obtained. In particular, when the shrinkage ratio in the length direction and the shrinkage ratio in the radial direction are respectively 15% or less and 35% or more in the case of the immersion in warm water at 90° C. for 5 seconds, low-temperature shrinkage properties are obtained, and the tube can be preferably used as for covering electronic components, in particular, capacitors such as aluminum electrolysis capacitors.

When the tube fulfills the heat shrinkage characteristics (1) described above, preferably the heat shrinkage characteristics (1) and (2), the covering appearance is favorable, the tube can be shrunk at low temperatures in the case of covering an object to be covered, thus allowing the energy cost to be kept down, and in addition, allowing the tube to be covered under almost the same conditions as for conventional tubes with the use of an existing covering machine. It is to be noted that the shrinkage ratio mentioned above refers to a shrinkage ratio obtained in the case of immersion in warm water for 5 seconds, while the shrinkage ratio in the case of immersion in warm water for 30 seconds has ever been used in similar evaluations in some cases. In recent years, the step of covering capacitors, etc, with tubes has been increased in speed for the purpose of improvement in productivity; whereby there is a tendency for the covering conditions to increase the temperature and reduce the time. Because it is difficult to match the conventional measurement time with actual production processes, the conditions described above are employed.

The heat shrinkage characteristics are obtained by appropriately adjusting, such as, the glass transition temperature Tg of the resin composition (A), the stretching temperature of the tube. For example, in order to obtain the heat shrinkage characteristics, when the shrinkage ratio in the length direction is to be increased to the upper limit (30% at 100° C., 25% at 90° C.) side, the ratio is increased between the feed rate of the unstretched tube and the nip roll rate after the stretching; or when the shrinkage ratio is to be decreased to the lower limit (0%) side, the ratio is decreased between the feed rate of the unstretched tube and the nip roll rate after the stretching. In addition, in order to obtain the heat shrinkage characteristics, when the shrinkage ratio in the radial direction is to be increased to the upper limit (70% at 100° C., 60% at 90° C.) side, the ratio is increased between the diameter of the unstretched tube and the diameter of the tube after the stretching; or when the shrinkage ratio is to be decreased to the lower limit (30% at 100° C., 20% at 90° C.) side, the ratio is decreased between the diameter of the unstretched tube and the diameter of the tube after the stretching.

<Flame Retardancy and Impact Resistance of Tube According to Present Invention>

It is important for the tube according to the present invention to exhibit flame retardancy VW-1 in accordance with evaluation by UL224 Optional VW-1 Flame Test and fracture energy of 0.2 J or more by a puncture impact test at 23° C. The tube according to the present invention exhibits flame retardancy VW-1 in accordance with evaluation by UL224 Optional VW-1 Flame Test, and thus maintains excellent flame retardancy. In addition, since the tube according to the present invention exhibits fracture energy of not less than the numerical value mentioned above, the tube can develop excellent impact resistance when the tube is molded into a covering material, and can be preferably used as covering material for, for example, capacitors and batteries.

If the fracture energy confirmed by a puncture impact test at 23° C. is less than 0.2 J, the tube as a covering material for capacitors and batteries is likely to cause problems such as cracks. Based on this point of view, the fracture energy confirmed by a puncture impact test at 23° C. is preferably 0.25 J or more, more preferably 0.3 J or more, further preferably 0.4 J or more. The fracture energy has an upper limit which is not particularly limited; the upper limit is preferably 1.75 J, and further preferably 1.6 J in terms of flexibility and processability for automatic covering machine (for example, the life of cutting teeth).

The thickness of the tube according to the present invention is not particularly limited; the tube preferably has a thickness of 0.05 mm or more, preferably 0.07 mm or more, further preferably 0.1 mm or more, and 1.0 mm or less, preferably 0.5 mm or less, more preferably 0.40 mm or less, further preferably 0.30 mm or less, particularly preferably 0.20 mm or less, in consideration of use for covering capacitors, battery components and the like. In addition, the width of the folded tube (hereinafter, referred to as a "folding diameter") are preferably within a range from 4 mm to 300 mm in terms of the flexibility to deal with covering for general-purpose capacitors and batteries and general packaging for general-purpose batteries. For example, in order for a heat-shrinkable tube with a thickness of 0.10 mm to exhibit fracture energy of 0.20 J or more in a puncture impact test at 23° C. and maintain excellent properties such as flame retardancy, it is desirable to control the content rate of the PPS resin (a) in the resin composition to 80 mass % or more and 95 mass % and the content rate of the thermoplastic elastomer (b) to 3 mass % or more and 12 mass % or less. In the case of the heat-shrinkable tube with a thickness of 0.10 mm, the content rate of the thermoplastic elastomer (b) greater than 12 mass % may possibly damage the flame retardancy of the heat-shrinkable tube; on the other hand, the content rate of the thermoplastic elastomer (b) less than 3 mass % is highly likely to result in fracture energy less than 0.2 J in a puncture impact test at 23° C. It should be noted that while a case of the heat-shrinkable tube with a thickness of 0.10 mm has been described as an example, an appropriate thickness can be selected depending on the application of the covering material. In this case, the amount of the thermoplastic elastomer (b) added to the PPS resin (a) can be adjusted to provide a heat-shrinkable tube which is also excellent in impact resistance while maintaining the properties of the PPS resin (a) such as heat resistance and flame retardancy. For example, depending on the increase in thickness, the additive amount of the thermoplastic elastomer (b) can be reduced within a scope which does not impair the advantageous effects of the present invention.

[Component Covered with Tube According to Present Invention]

The tube according to the present invention is composed of the resin composition (A) containing the PPS resin (a) as the main constituent, and it is excellent in heat resistance, low-temperature shrinkage characteristics, electrical characteristics, chemical resistance, and electrolytic solution resistance.

Therefore, the tube according to the present invention can be preferably used as a material for covering capacitors such as aluminum electrolysis capacitors, and also used for other applications, for example, as a material for covering electric wires (round wires, square wires), secondary batteries such as dry batteries and lithium ion batteries, electrical devices and compact motors such as steel pipes or motor coil ends and trans, or light bulbs, fluorescent lights, and fluorescent lights of facsimiles and image scanners.

EXAMPLES

While the present invention is described below in further detail with reference to examples, the present invention is not to be considered limited by the examples in any way.

Further, the heat-shrinkable tubes described in this specification were measured for various measurement values and evaluated as follows.

(1) Cold Crystallization Temperature Tc

The cold crystallization temperature Tc was obtained from a thermogram when increasing the temperature of a sample of 10 mg cut out from a formed heat-shrinkable tube from −50° C. to 340° C. at a heating rate of 10° C./min in accordance with JIS-K7121 with the use of DSC-7 manufactured by PerkinElmer, Inc.

(2) Glass Transition Temperature Tg

The glass transition temperature Tg was obtained from a thermogram when increasing the temperature of a sample of 10 mg cut out from a formed heat-shrinkable tube from −50° C. to 340° C. at a heating rate of 10° C./min, keeping the sample at 340° C. for 1 minute, then decreasing the temperature to −50° C. at a cooling rate of 10° C./min, keeping the sample at −50° C. for 1 minute, and then increasing the temperature again at a heating rate of 10° C./min, in accordance with JIS-K7121 with the use of DSC-7 manufactured by PerkinElmer, Inc.

(3) Shrinkage Ratio of Heat-Shrinkable Tube

The length and folding diameter of the heat-shrinkable tube before and after immersion in warm water at 90° C. and 100° C. for 5 seconds were measured and calculated from the following formulas.

Shrinkage Ratio in Length Direction [%]=[(Length of Tube before Immersion−Length of Tube after Immersion)/Length of Tube before Immersion]×100

Shrinkage Ratio in Radial Direction [%]=[(Folding Diameter of Tube before Immersion−Folding Diameter of Tube after Immersion)/Folding Diameter of Tube before Immersion]×100

(4) Flame Retardancy

The flame retardancy of heat-shrinkable material obtained from the resin composition according to the present invention was evaluated by UL224 Optional VW-1 Flame Test which is used for the evaluation of flame retardancy.

○: meeting the evaluation criteria for VW-1
×: failing to meet the evaluation criteria for VW-1

(5) Finish of Covering

The finish of covering was evaluated in accordance with the following criteria, in the case of covering an aluminum electrolysis capacitor of $\phi$ 35 mm in diameter and 59.5 mm in length with a tube of 59 mm in folding diameter, 0.1 mm in wall thickness and 73 mm in length at 200° C. for 5 seconds in a circulating hot air shrink oven.

○: the tube closely attached to the capacitor
×: the tube not closely attached to the capacitor (6) Heat Resistance (Swelling Property)

An aluminum electrolysis capacitor of $\phi$ 35 mm in diameter and 59.5 mm in length was covered with a tube of 59 mm in folding diameter, 0.1 mm in wall thickness and 73 mm in length at 200° C. for 5 seconds in a circulating hot air shrink oven, aging was carried out under an atmosphere at 85° C. for 60 minutes in a hot air oven, the capacitor covered with the tube was then exposed to an atmosphere at 200° C. for 5 minutes in the hot air oven, and the heat resistance was evaluated in accordance with the following criteria.

○: no swelling caused
×: swelling caused (7) Fracture Energy Confirmed by Puncture Impact Test The fracture energy of the heat-shrinkable tube was measured by the puncture impact test.

In this case, the fracture energy confirmed by the puncture impact test refers to energy measured by a combination of a puncture impact method described in JIS K7211-2 and a self-developed method. The self-developed method in this case represents a method which meets any one of the following conditions: an impact velocity of 0.5 m/min or more and 15 m/min or less, a test temperature of −40° C. or more and 150° C. or less, a fixed size (diameter) of $\phi$40 mm or $\phi$2 inches (50.8 mm) of a test specimen in a test device, and a punching jig (striker) of any of $\phi$½ inches (12.7 mm), $\phi$1 inch (25.4 mm), and $\phi$2 inches (50.8 mm) in size (diameter). As the test conditions in the examples this time, the following conditions were used: an impact velocity of 3 m/min; a test temperature of 23° C.; a fixed size (diameter) of $\phi$40 mm of a test specimen; and a striker of ½ inches (12.7 mm).

(8) Drop Test

A stainless-steel rod of 35 mm in outside diameter and 380 mm in length was covered with the heat-shrinkage tube under the conditions of 150° C. and 40 seconds with the use of a circulating hot air shrink tunnel. Furthermore, after that, the rod covered with the tube was subjected to a heat treatment at 85° C. for 24 hours in a circulating hot air thermostatic bath, and next, dropped from a height of 1 m from the floor at ordinary temperature, and the appearance of the rod covered with the tube was evaluated in accordance with the following criteria.

(○): no crack caused
(×): cracks caused (9) Raw Materials Used

For the resin composition constituting the heat-shrinkable tube subjected to the evaluations described above, raw materials used in Examples, Comparative Examples, and a Reference Example are listed below.

PPS: polyphenylene sulfide resin [manufactured by Polyplastics Co., Ltd., Trade Name: FORTRON 022009, Apparent Viscosity (300° C., shear rate: 100 sec$^{-1}$): 510 Pa·s]

Thermoplastic Elastomer: acid-modified SEBS resin (manufactured by Asahi Kasei Chemicals Corporation, Trade Name: TUFTEC M1943)

Phosphorus-based Plasticizer 1: triphenyl phosphate (manufactured by DAIHACHI CHEMICAL INDUSTRY CO., LTD., Trade Name: TPP)

Phosphorus-based Plasticizer 2: resorcinol bisdi-2,6-xylenyl phosphate (manufactured by DAIHACHI CHEMICAL INDUSTRY CO., LTD., Trade Name: Px-200)

Thermoplastic Resin 1: polycarbonate resin (manufactured by Mitsubishi Engineering-Plastics Corporation, Trade Name: IUPILON S2000)

Thermoplastic Resin 2: polyphenylene ether resin (manufactured by SABIC, Trade Name: NORYL PX9406)

Examples 1 to 7, Comparative Examples 1 to 3, and Reference Example 1

The resin compositions listed in Table 1 were dissolved by an extruder with its cylinder temperature set to 300° C., and subjected to a tubular molding process through a round die to obtain a tube of 59 mm in folding diameter and 0.1 mm in thickness. Table 1 shows the results of evaluating the properties of the obtained tubes.

TABLE 1

| | | | Examples | | | | | | | Comparative examples | | | Reference example |
|---|---|---|---|---|---|---|---|---|---|---|---|---|---|
| | | | 1 | 2 | 3 | 4 | 5 | 6 | 7 | 1 | 2 | 3 | 1 |
| Resin Composition (A) [mass %] | PPS (a) | | 90 | 87 | 85 | 84 | 86 | 70 | 73 | 100 | 79 | 80 | 93 |
| | Thermoplastic Elastomer (b) | | 5 | 7 | 9 | 7 | 8 | 9 | — | — | 14 | 10 | — |
| | Plasticizer (c) | Plasticizer 1 | 5 | 6 | 6 | — | — | 7 | — | — | 7 | 10 | 7 |
| | | Plasticizer 2 | — | — | — | 9 | 6 | — | 9 | — | — | — | — |
| | Other Resins (d) | Resin 1 | — | — | — | — | — | 14 | — | — | — | — | — |
| | | Resin 2 | — | — | — | — | — | — | 18 | — | — | — | — |
| Draw Ratio [times] | Length Direction | | 1.7 | 1.7 | 1.7 | 1.7 | 1.7 | 1.7 | 1.7 | 1.7 | 1.7 | 1.7 | 1.7 |
| | Radial Direction | | 1.1 | 1.1 | 1.1 | 1.1 | 1.1 | 1.1 | 1.1 | 1.1 | 1.1 | 1.1 | 1.1 |
| Glass Transition Temperature Tg [° C.] | | | 65 | 66 | 67 | 78 | 81 | 68 | 78 | 89 | 63 | 65 | 65 |
| Cold Crystallization Temperature Tc [° C.] | | | 104 | 102 | 102 | 121 | 122 | 105 | 118 | 137 | 97 | 87 | 102 |
| Tc-Tg [° C.] | | | 39 | 36 | 35 | 43 | 41 | 37 | 40 | 48 | 34 | 22 | 37 |
| Puncture Fracture Energy [J] | | | 0.6 | 0.9 | 1 | 0.9 | 0.6 | 1.4 | 0.6 | 0.1 | 1.3 | 1.2 | 0.1 |
| Shrinkage Ratio [%] | 90° C. | Length Direction | 14 | 14 | 14 | 9 | 9 | 5 | 5 | Unformable | 7 | 8 | 6 |
| | | Radial Direction | 37 | 39 | 39 | 40 | 40 | 41 | 40 | | 40 | 40 | 47 |
| | 100° C. | Length Direction | 15 | 15 | 15 | 10 | 10 | 6 | 6 | | 8 | 10 | 6 |
| | | Radial Direction | 38 | 40 | 40 | 41 | 41 | 43 | 41 | | 39 | 39 | 48 |
| Flame Retardancy (achievement of VW-1) | | | ○ | ○ | ○ | ○ | ○ | ○ | ○ | ○ | x | ○ | ○ |
| Finish of Covering | | | ○ | ○ | ○ | ○ | ○ | ○ | ○ | x | ○ | ○ | ○ |
| Drop Test | | | ○ | ○ | ○ | ○ | ○ | ○ | ○ | Unevaluable | ○ | ○ | x |
| Heat Resistance (Swelling Property) | | | ○ | ○ | ○ | ○ | ○ | ○ | ○ | Unevaluable | x | x | ○ |

As is obvious from Table 1, the tubes according to the present invention have heat resistance, low-temperature shrinkage characteristics, finish of covering, flame retardancy, and impact resistance within the defined scope of the present invention. In contrast, in the case of the glass transition temperature Tg greater than 85° C. (Comparative Example 1), no film was able to be formed, and in the case of the difference Tc–Tg of less than 35° C. (Comparative Example 2 or 3), the heat resistance was inferior. In addition, when the fracture energy confirmed by the puncture impact test was less than the preferable range of the present invention (Reference Example 1), the impact resistance was inferior.

As described above, while the present invention has been described in connection with the embodiments which are currently considered most practical and preferable, the present invention is not to be considered limited to the embodiments disclosed in this specification, and can be appropriately varied as long as the variation is not contrary to the subject of the present invention which can be read from the claims and the entire specification, and it should be understood that the technical scope of the present invention also encompasses polyphenylene sulfide-based heat-shrinkable tube to which such changes have been made, and components covered with the tubes.

INDUSTRIAL APPLICABILITY

The polyphenylene sulfide-based heat-shrinkable tube according to the present invention is preferable for covering electronic components, in particular, capacitors such as aluminum electrolysis capacitors.

The invention claimed is:

1. A polyphenylene sulfide based sulfide-comprising heat-shrinkable tube, comprising:
   a resin composition (A) comprising a thermoplastic polyphenylene sulfide-based resin (a) as a main constituent,
   wherein the tube has a difference of 35° C. or more between a cold crystallization temperature Tc and a glass transition temperature Tg measured by a differential scanning calorimetry in accordance with JIS-K7121, and the glass transition temperature Tg of the tube is in a range of 65° C. or more and 85° C. or less.

2. The tube of claim 1, exhibiting a flame retardancy VW-1 in accordance with evaluation by UL224 Optional VW-1 Flame Test and fracture energy of 0.2 J or more by a puncture impact test at 23° C.

3. The tube of claim 1, having a heat shrinkage ratio in the case of immersion in warm water at 100° C. for 5 seconds is 30% or more and 70% or less in a radial direction, and 30% or less in a length direction.

4. The tube of claim 1, wherein the resin composition (A) further comprises a thermoplastic elastomer (b).

5. The tube of claim 4, wherein a content of the thermoplastic elastomer (b) is 0.5 mass % or more and 13 mass % or less with respect to 100 mass % of the resin composition (A).

6. The tube of claim 4, wherein the resin composition (A) further comprises a plasticizer (c).

7. The tube of claim 6, wherein the plasticizer (c) is a phosphorous-comprising plasticizer.

8. The tube of claim 7, comprising a resin composition comprising:
   80-95 mass % of the thermoplastic polyphenylene sulfide-comprising resin (a);
   3-13 mass % of the thermoplastic elastomer (b); and
   0.5-15 mass % of the phosphorous-comprising plasticizer (c),
   with respect to the total 100 mass % of the thermoplastic polyphenylene sulfide-comprising resin (a), the thermoplastic elastomer (b), and the phosphorous-comprising plasticizer (c).

9. The tube of claim 6, wherein a content of the thermoplastic elastomer (b) is 0.5 mass % or more and 13 mass % or less with respect to 100 mass % of the resin composition (A).

10. The tube of claim 6, wherein a content of the plasticizer (c) is 0.5 mass % or more and 15 mass % or less with respect to 100 mass % of the resin composition (A).

11. The tube of claim 4, having a heat shrinkage ratio in the case of immersion in warm water at 100° C. for 5 seconds is 30% or more and 70% or less in a radial direction, and 30% or less in a length direction.

12. The tube of claim 1, wherein the resin composition (A) further comprises a plasticizer (c).

13. The tube of claim 12, wherein the plasticizer (c) is a phosphorous-comprising plasticizer.

14. The tube of claim 12, wherein a content of the plasticizer (c) is 0.5 mass % or more and 15 mass % or less with respect to 100 mass % of the resin composition (A).

15. The tube of claim 12, having a heat shrinkage ratio in the case of immersion in warm water at 100° C. for 5 seconds is 30% or more and 70% or less in a radial direction, and 30% or less in a length direction.

16. The tube of claim 1, wherein the resin composition (A) comprises at least one further thermoplastic resin (d), different from the thermoplastic polyphenylene sulfide-comprising resin (a).

17. The tube of claim 16, wherein a content of the at least one further thermoplastic resin (d) is 0.5 mass % or more and 25 mass % or less with respect to 100 mass % of the resin, composition (A).

18. The tube of claim 1, having a heat shrinkage ratio in the case of immersion in warm water at 90° C. for 5 seconds is 20% or more and 60% or less in a radial direction, and 25% or less in a length direction.

19. A component, covered with the tube of claim 1.

20. The component of claim 19, which is employed in an application of an electronic device or an electric device.

* * * * *